United States Patent [19]

Stoops

[11] Patent Number: 5,774,163
[45] Date of Patent: Jun. 30, 1998

[54] BINARY WEIGHTED MODULATION FOR A PARALLEL INPUT PRINT HEAD

[75] Inventor: James T. Stoops, Walworth, N.Y.

[73] Assignee: Eastman Kodak Company, Rochester, N.Y.

[21] Appl. No.: 425,276

[22] Filed: Apr. 20, 1995

[51] Int. Cl.[6] .................................................. B41J 2/355
[52] U.S. Cl. ............................................................ 347/211
[58] Field of Search .................................. 347/211, 183, 347/186, 180, 181, 182, 237, 240; 358/298; 395/101

[56] References Cited

U.S. PATENT DOCUMENTS

| | | | |
|---|---|---|---|
| 4,621,271 | 11/1986 | Brownstein | 346/76 PH |
| 4,806,950 | 2/1989 | Sekine et al. | 346/76 PH |
| 4,819,008 | 4/1989 | Nagato et al. | 347/184 |
| 4,951,152 | 8/1990 | Suzuki et al. | 358/298 |
| 4,994,822 | 2/1991 | Caine | 346/76 PH |
| 5,604,527 | 2/1997 | Ng et al. | 347/240 |

FOREIGN PATENT DOCUMENTS

| | | | |
|---|---|---|---|
| 4-282263 | 10/1992 | Japan | 347/211 |
| 4-320860 | 11/1992 | Japan | 347/211 |

*Primary Examiner*—Huan H. Tran
*Attorney, Agent, or Firm*—Milton S. Sales

[57] ABSTRACT

A process for printing an image data signal, using a parallel input print head which has an input data bus which is narrower than the image data signal, includes the steps of splitting the image data signal into multiple data groups such that each data group (1) has a maximum allowable width equal to the width of the input data bus and (2) consists of consecutive binary value bits of the image data signal. The data groups are loaded to the print head, and the data of the one data group is printed according to its binary weighting in the image data signal. The loading and printing steps are repeated for each data group. The printing step comprises deamplifying the value of the bits of the data groups and amplifying a printer's output by a factor according to the binary weighting of each data group being printed.

8 Claims, 10 Drawing Sheets

BINARY WEIGHTED MODULATION FOR A PARALLEL INPUT PRINT HEAD

CROSS-REFERENCE TO RELATED APPLICATION

Reference is made to commonly assigned, co-pending U.S. patent application Ser. No. 08/425,278 filed in the names of J. Stoops and D. Johnson concurrently herewith.

BACKGROUND OF THE INVENTION

1. Technical Field

This invention relates generally to image printers having parallel input print heads.

2. Background Art

A thermal printer is one commercial example of an image printer that has traditionally used serial input print heads which receive one or more single-bit wide data input. FIG. 1 illustrates a typical configuration of a thermal printer, such as those adapted for dye or wax transfer from donor media to image receiver media. Data is clocked into a series of shift registers 10 by a HEADCLK signal. The data stored in each shift register is then transferred to a respective latch register 12 by activating LATCH signal. Heater elements 14 may then be activated according to the data stored in the latch registers by applying an ENABLE signal to a series of AND gates 16.

However the images to be printed are often multiple bits per pixel. Because conventional serial input print heads are not able to store all of the information associated with a line of image data at one time, data must be loaded to the serial input print head multiple times to reproduce a multi-bits per pixel image. Over the years many techniques have been developed to print multi-bit images with these serial input print heads. See for example U.S. Pat. Nos. No. 4,621,271, which issued to S. Brownstein on Nov. 4, 1986; No. 4,994,822, which issued to H. Cane on Feb. 19, 1991; No. 4,806,950, which issued to K. Sekine et al. on Feb. 21, 1989; and No. 4,951,152, which issued to K. Suzuki et al. on Aug. 21, 1990.

A system which incorporates a serial input print head is shown in FIG. 2. Given image data which is N bits wide, prior art modulation techniques require that data be loaded into the print head between N and $2^N$ times, to achieve the $2^N$ possible print densities. When using a serial input print head, the number of times a print head is loaded is a primary factor in determining print speed. Therefore, prior art modulation techniques which only require N print head loads to achieve $2^N$ print densities typically provide fast print times, but have exhibited poor image quality. Modulation techniques which require $2^N$ print head loads generally exhibit higher image quality but require longer printing times. It has therefore been desirable to find a print head architecture and modulation technique which provides both fast printing times and high image quality.

Recently, parallel input print heads which accept more than a single bit wide data bus have been introduced into the marketplace. A typical architecture for such a print head is shown in FIG. 3. A series of shift registers 18 store image data. A series of 8-bit DOWN counters 20 and flip flops 22 serve as a means for modulating the multi-bit image data on the print head itself. A system which incorporates such a parallel input print head is shown in FIG. 4.

As would be expected, the control of the parallel input print head differs somewhat from controlling a serial input print head. FIG. 5 illustrates a typical control sequence. A DATA signal 24 is clocked into the print head's shift registers 18 (FIG. 3), N bits at a time, by pulsing a HEADCLK signal 26. Once an entire line of data has been loaded into the print head, a LATCH~ signal 28 is pulsed LOW to load the contents of shift registers 18 into DOWN counters 20. After the counters have been loaded, flip flops 22 may be set by pulsing a SET~ signal 30 LOW. After setting the flip flops, respective heater elements 32 may be energized by activating an ENABLE~ signal 34. Pulse width modulation is achieved with this system by clocking a COUNTCLK signal 36 while ENABLE~ signal 34 is active. When an individual counter 20 reaches zero, the carry output of the counter is activated, and the associated flip flop's output is cleared; turning OFF the respective one of the heater elements 32.

When the number (N) of bits in the image data is less than or equal to the number (M) of bits in the parallel print head's input bus, the parallel print head directly provides a means of printing all $2^N$ print levels represented by the image data. High quality images may be printed at fast print times. However, these print heads do not directly provide a means of achieving all $2^N$ print levels when the number of bits in the image data is greater than the number of bits in the parallel print head's data input bus (N≧M). These print heads require a new method for handling image data which has more print levels than the parallel input print head is capable of directly printing.

SUMMARY OF THE INVENTION

Accordingly, it is an object of the present invention to provide an apparatus and method for printing image data which has more levels than that which a parallel input print head was designed to print.

It is another object of the present invention to provide an apparatus and method for generating all of the print levels represented by an image data signal using a parallel input print head which has an input data bus which is narrower than the image data.

According to a feature of the present invention, a process for printing an image data signal, using a parallel input print head which has an input data bus which is narrower than the image data signal, includes the steps of splitting the image data signal into multiple data groups such that each data group (1) has a maximum allowable width equal to the width of the input data bus and (2) consists of consecutive binary value bits of the image data signal. The data groups are loaded to the print head, and the data of the one data group is printed according to its binary weighting in the image data signal. The loading and printing steps are repeated for each data group.

According to another feature of the present invention, the printing step comprises deamplifying the value of the bits of the data groups and amplifying a printer's output by a factor according to the binary weighting of each data group being printed.

The invention, and its objects and advantages, will become more apparent in the detailed description of the preferred embodiments presented below.

BRIEF DESCRIPTION OF THE DRAWINGS

In the detailed description of the preferred embodiments of the invention presented below, reference is made to the accompanying drawings, in which.

BEST MODE FOR CARRYING OUT THE INVENTION

The present description will be directed in particular to elements forming part of, or cooperating more directly with, apparatus in accordance with the present invention. It is to be understood that elements not specifically shown or described may take various forms well known to those skilled in the art. While the invention is described below in the environment of a thermal printer, it will be noted that the invention can be used with other types of imaging apparatus.

In all of the following discussions it will be assumed that the number of bits in the image data is greater than the number of bits in the input data bus of the parallel print head unless otherwise noted.

Figure 1:
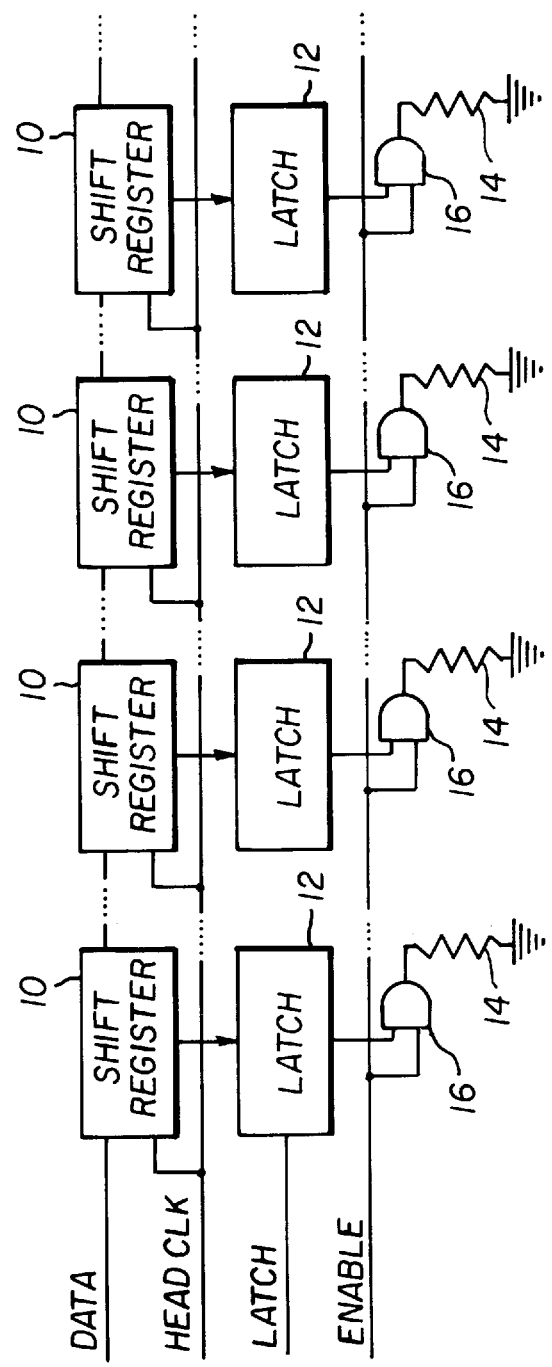
FIG. 1 is a block diagram of a serial input print head according to the prior art.
Figure 2:
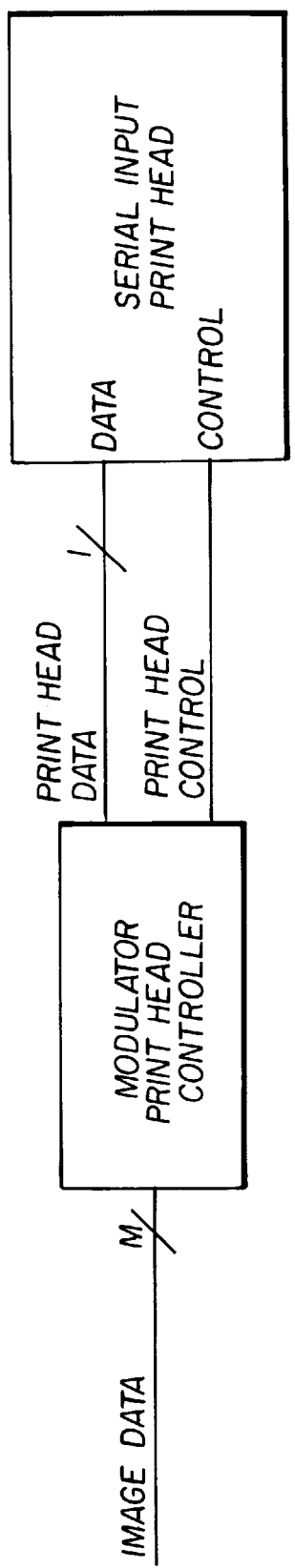
FIG. 2 is a block diagram of a system for the serial input print head of FIG. 1 according to the prior art.
Figure 4:
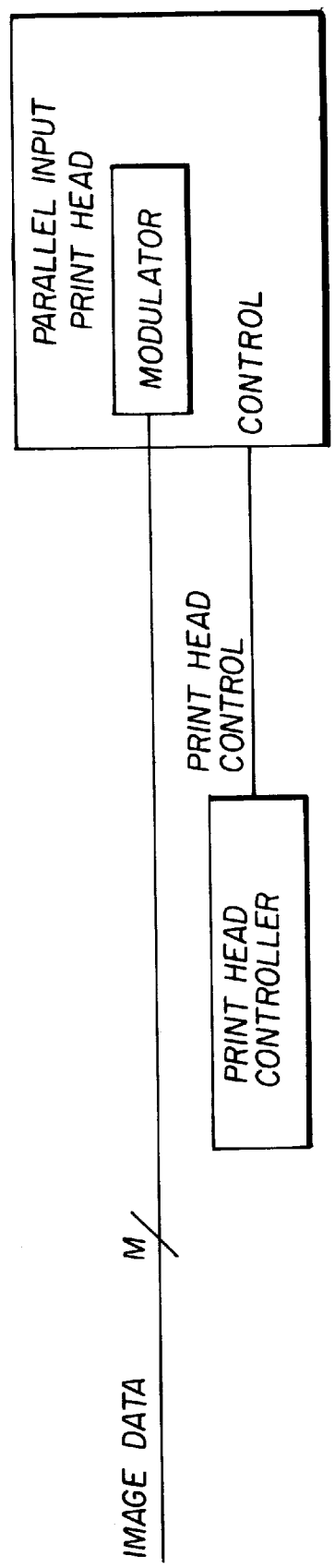
FIG. 4 is a block diagram of a system for the parallel input print head of FIG. 3 according to the prior art.
Figure 3:
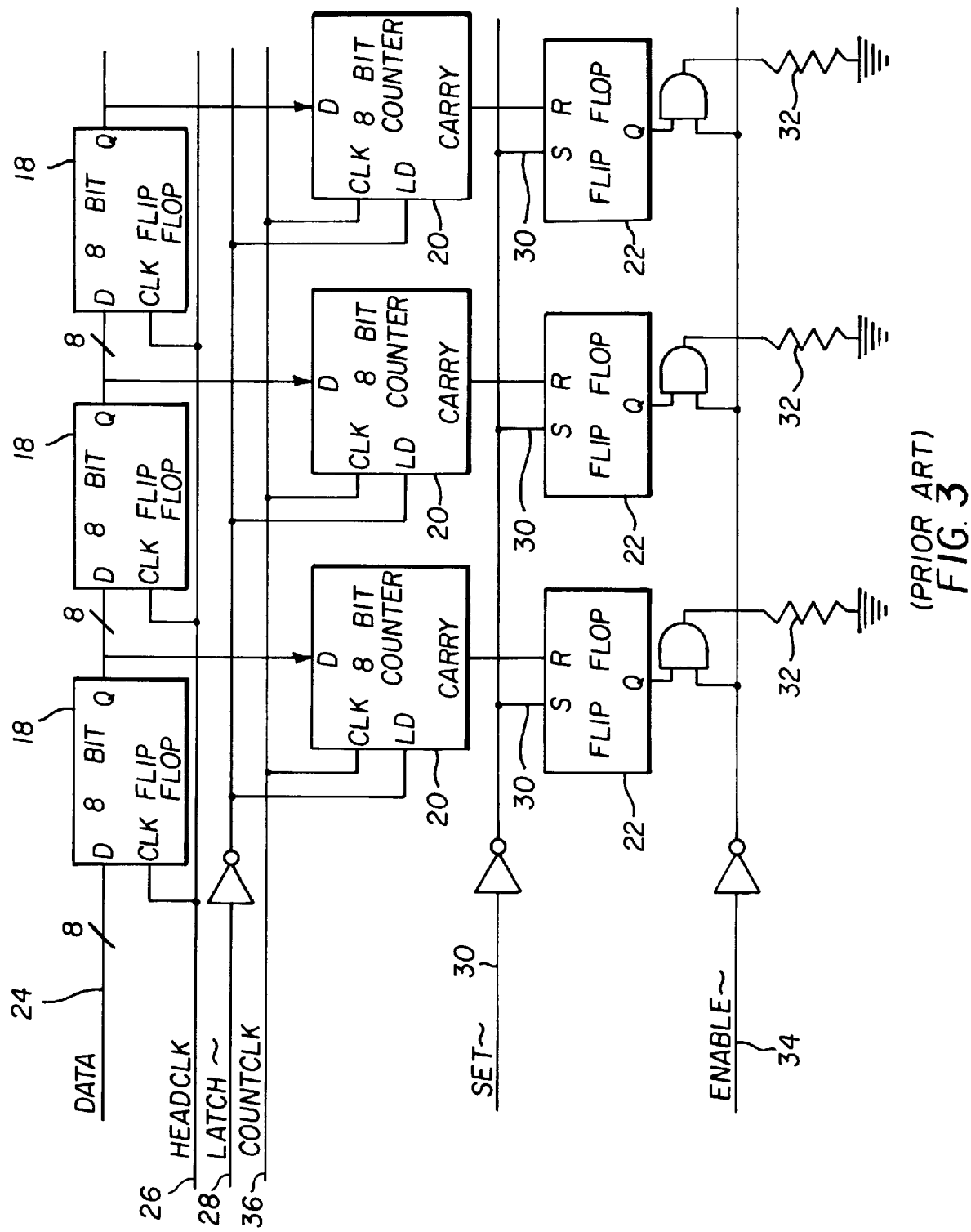
FIG. 3 is a block diagram of a parallel input print head which may be used with the present invention.
Figure 5:
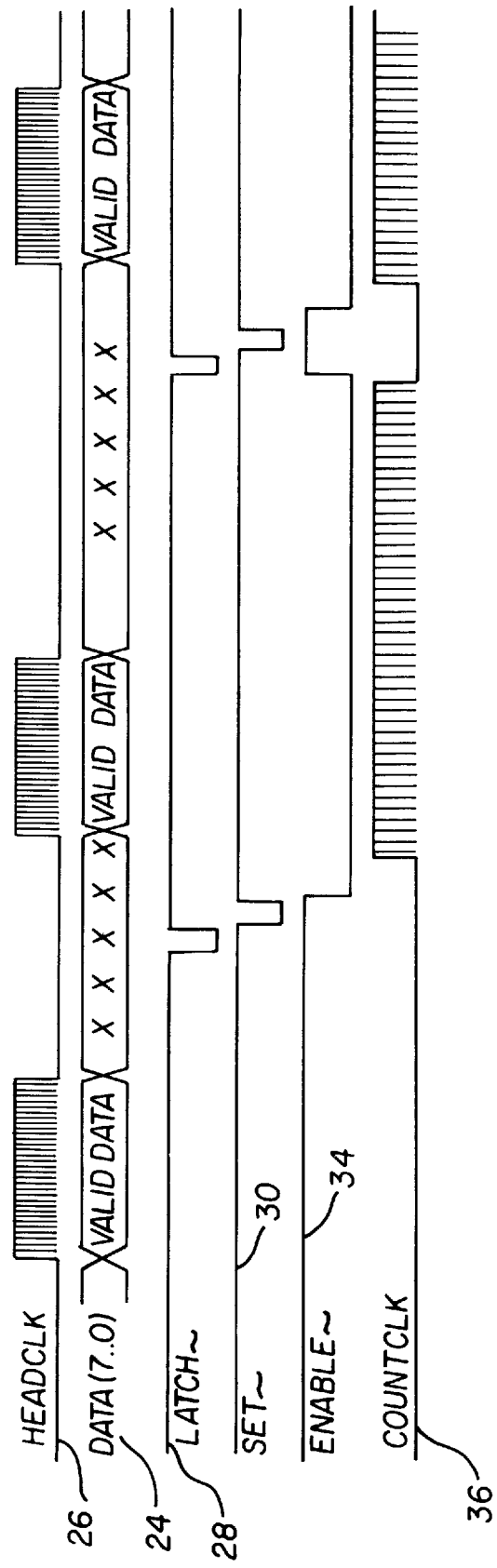
FIG. 5 is a timing diagram for printing with a parallel input print head.
Figure 6:
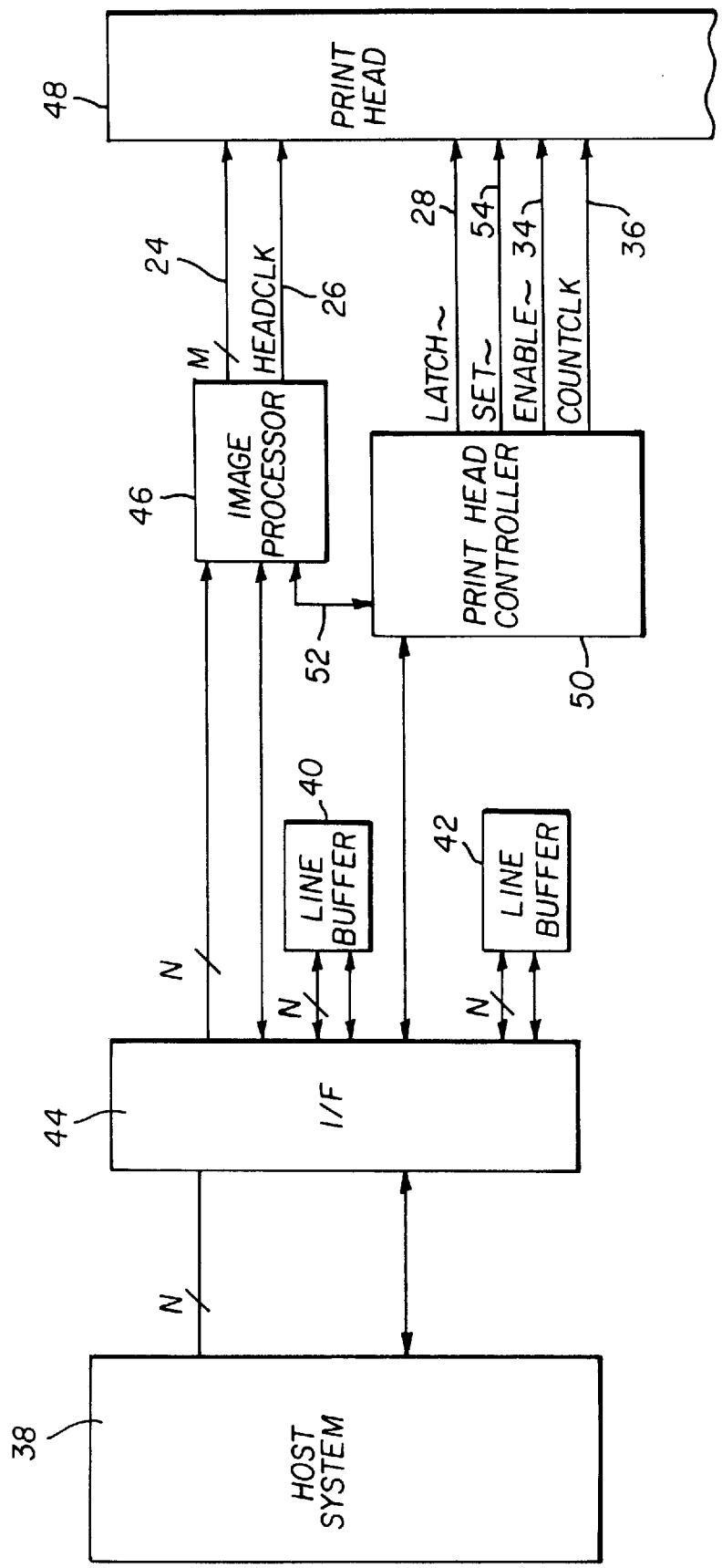
FIG. 6 is a block diagram of the printing apparatus according to the present invention.

Referring to FIG. 6, N-bit image data is first input into from a host system 38 to one of a pair of line buffers 40 and 42 via a host-data controller interface 44. Host-data interface 44 operates as a switching mechanism to connect one of the line buffers 40 and 42 to host system 38 while the other line buffer is connected as the input to a data controller 46. By switching the connections of the two line buffers, image data may be supplied to data controller 46 from one line buffer, while receiving next line image data into the other line buffer at the same time. For example, while image data is being supplied from host system 38 to line buffer 40, line buffer 42 is available to supply image data to data controller 46. At the completion of printing of the image data in line buffer 42, the image data in line buffer 40 is then used for printing, while next line data is input into line buffer 42. These line buffers and their "ping pong" configuration provide an efficient means of providing the image data to a print head 48 (as illustrated in FIG. 3) over the multiple print head loads required for the printing of the $2^N$ print levels. Strictly speaking neither line buffers 40 and 42, nor their ping pong configuration, are required for this technique to work properly. However, elimination of these devices will require that host system 38 supply the image data multiple times to print head 48, which may be undesirable for some applications.

Once a single line of image data has been stored into one of line buffers 40 and 42, the printing process may begin. The printing processes may be viewed as two synchronized processes: a print head loading process and a modulation process. A print head controller 50 is responsible for controlling the modulation process, and data controller 46 is responsible for loading the print head. The synchronization of the two processes is controlled by print head controller 50, which controls the overall system timing. Once print head controller 50 commands a print head load to start, the image data which is stored in line buffers 40 and 42 is written to data controller 46. The data controller 46 splits the image data and writes the appropriate group of bits to print head 48 by toggling HEADCLK signal 26. Data controller 46 may comprise a MUX (MUltipleXer) to split the original digital image data into the plurality of groups. After the entire line of data has been processed and loaded into print head 48, data controller 46 signals print head controller 50 via a control bus 52 that the print head load has been completed.

Once the initial print head load has been completed, LATCH~ signal 28 is pulsed to load the contents of the shift registers into the print head's DOWN counters 20 (FIG. 3). The print head controller then signals for the next print head load to begin. After the counters have been loaded and LATCH~ signal 28 is de-asserted, the flip flops are set by pulsing a SET~ signal 54 LOW. After setting the flip flops, heater elements 32 are energized by activating ENABLE~ signal 34. Pulse width modulation is achieved with this system by clocking COUNTCLK signal 36 while ENABLE~ signal 34 is active. When an individual counter 20 reaches ZERO, the carry output of the counter is activated and the associated flip flop's output is cleared, turning off the heater element 32. When all counters have reached ZERO, the modulation process has been completed.

Figure 7:
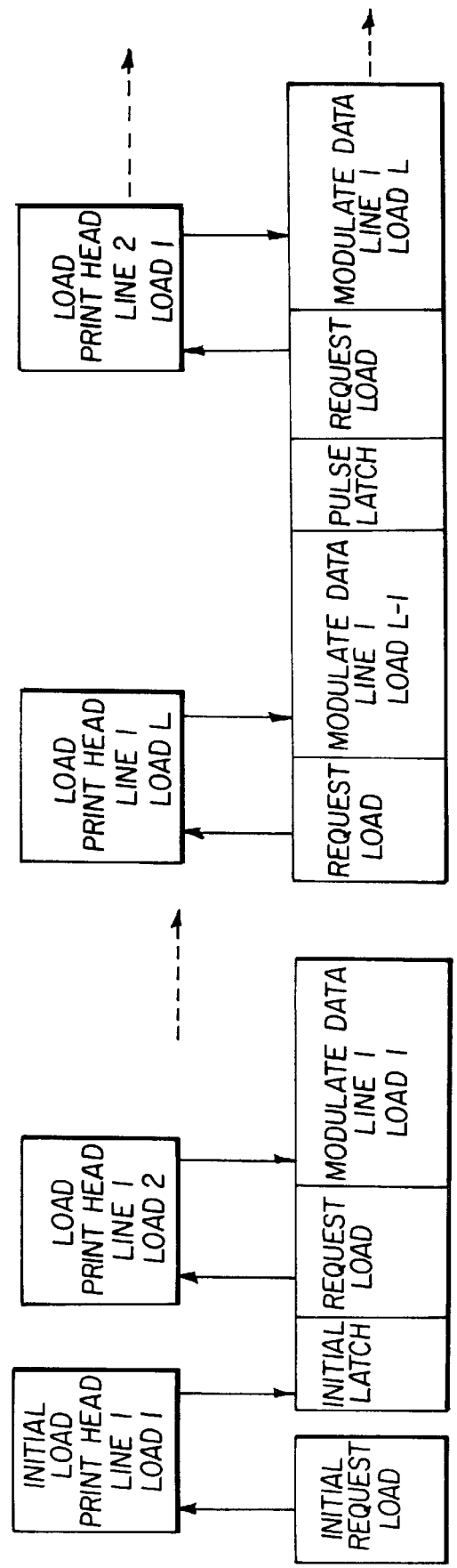
FIG. 7 illustrates the synchronization of the print head loading and modulation.

Meanwhile, modulation of the next set of data to be printed has been processed and loaded into the print head's shift registers 18. This data is loaded into down counters 20 by pulsing LATCH~ signal 28. Print head controller 50 then signals for the next print head load to begin. This process continues until the entire image has been printed. It should be noted that, after the initial load of the print head 48, the synchronization of the two processes does not need to discriminate between print lines. The synchronization of the two processes is illustrated in FIG. 7.

Figure 8:
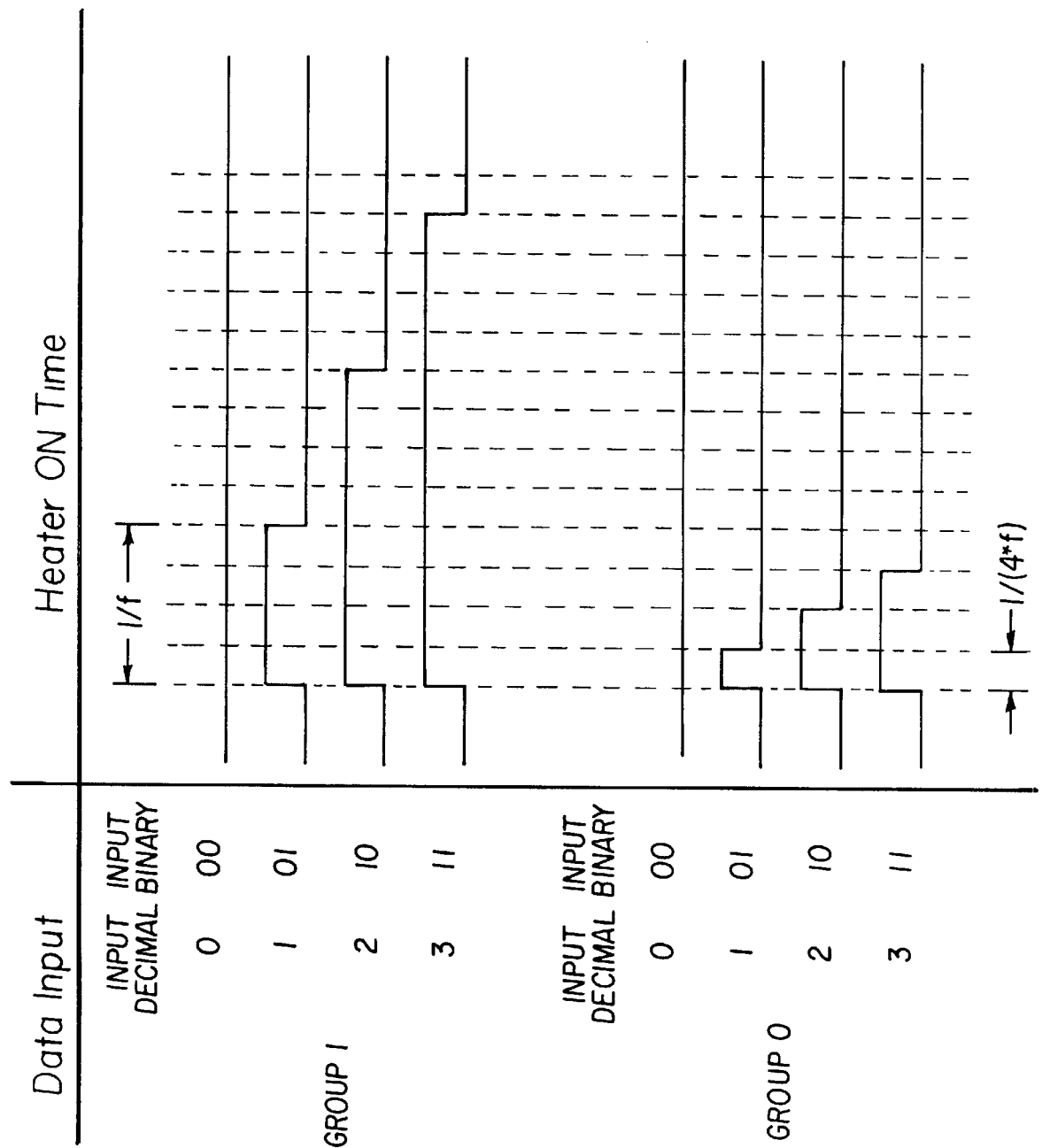
FIG. 8 is a timing chart of heater-ON time comparing the heater-ON times for 4-bit data being printed in two groups.
Figure 9:
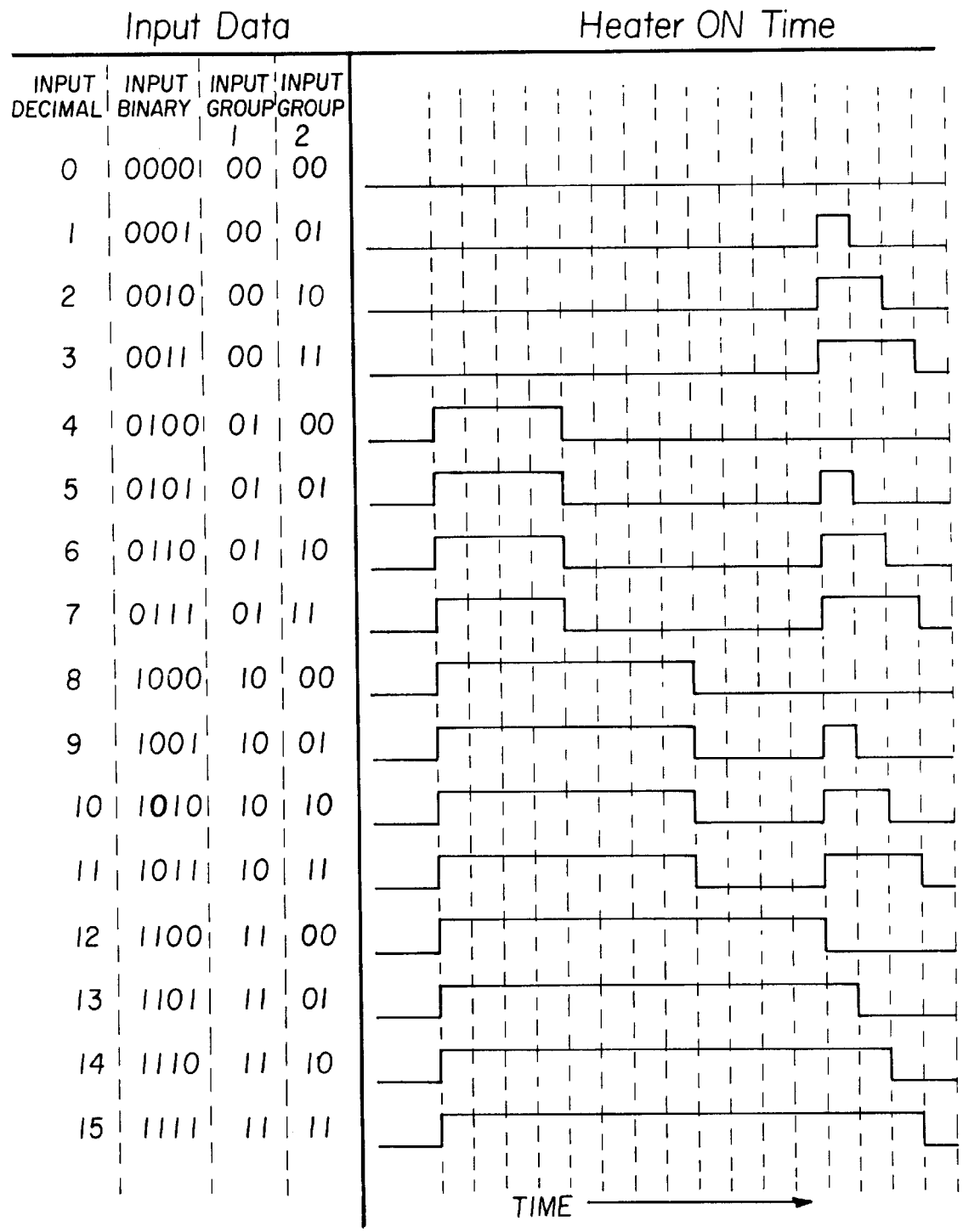
FIG. 9 is a timing chart of heater-ON time comparing the heater-ON times for 4-bit data being printed in two groups.
Figure 10:
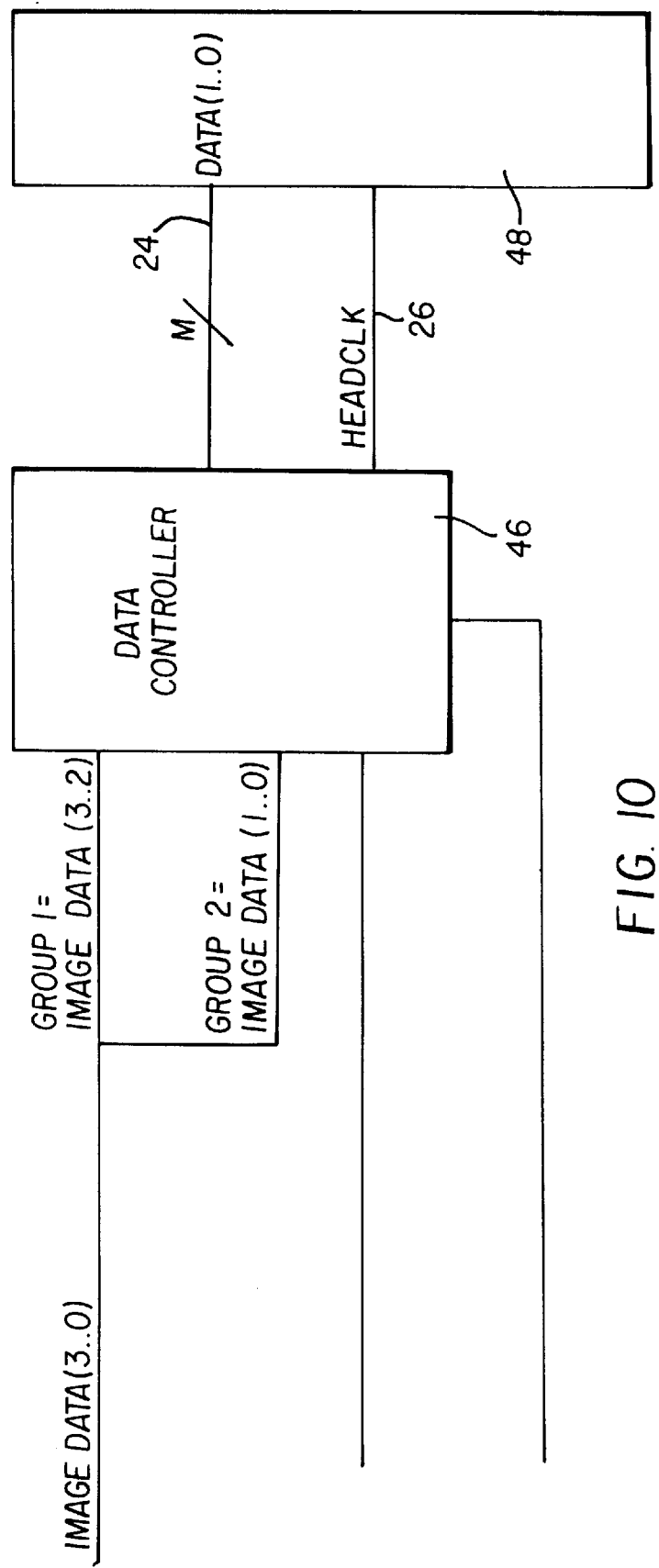
FIG. 10 illustrates splitting of the image data into groups.

The preceding discussion, which describes the loading and printing with parallel input print head 48, has assumed that printing $2^N$ print levels was possible. The following section describes in detail the conditions necessary to achieve $2^N$ print levels. An example using 4-bit image data and a parallel input print head with a 2-bit input bus is illustrated in FIGS. 8, 9, and 10. As illustrated by FIG. 10, image data is split by data controller 46 into two groups. Group 1 comprises the upper two data bits (bits 3 and 2) of the image data. Group 2 comprises the lower two data bits (bits 1 and 0) of the image data.

Print head 48 is first loaded with Group 1 data. Once loaded, the print head is modulated as has been previously described. When modulating the Group 1 data COUNTCLK signal 36 is pulsed at some nominal frequency, $\phi$. While Group 1 is being modulated, Group 2 is loaded to print head 48. The ability to load one set of data while a previously loaded set of data is printed has already been described. Once the printing of the Group 1 data has been completed for the current line, Group 2 data is printed. While printing the Group 2 data, COUNTCLK signal 36 is pulsed at a frequency of four times $\phi$. Therefore, the printing of a single line of image data requires the loading and printing of each of the groups of data into which the original data has been split.

FIG. 8 illustrates the difference in the heater ON time caused by the frequency change of the COUNTCLK signal. The factor of four increase of the COUNTCLK signal for Group 2 is caused by the difference in weighting between the least significant bits of the two groups of data. The least significant bits of Group 1 is bit two of the original image data. The weighting of this bit is four times ($2^2$) of the least significant bit of Group 2, which is bit zero.

Figure 11:
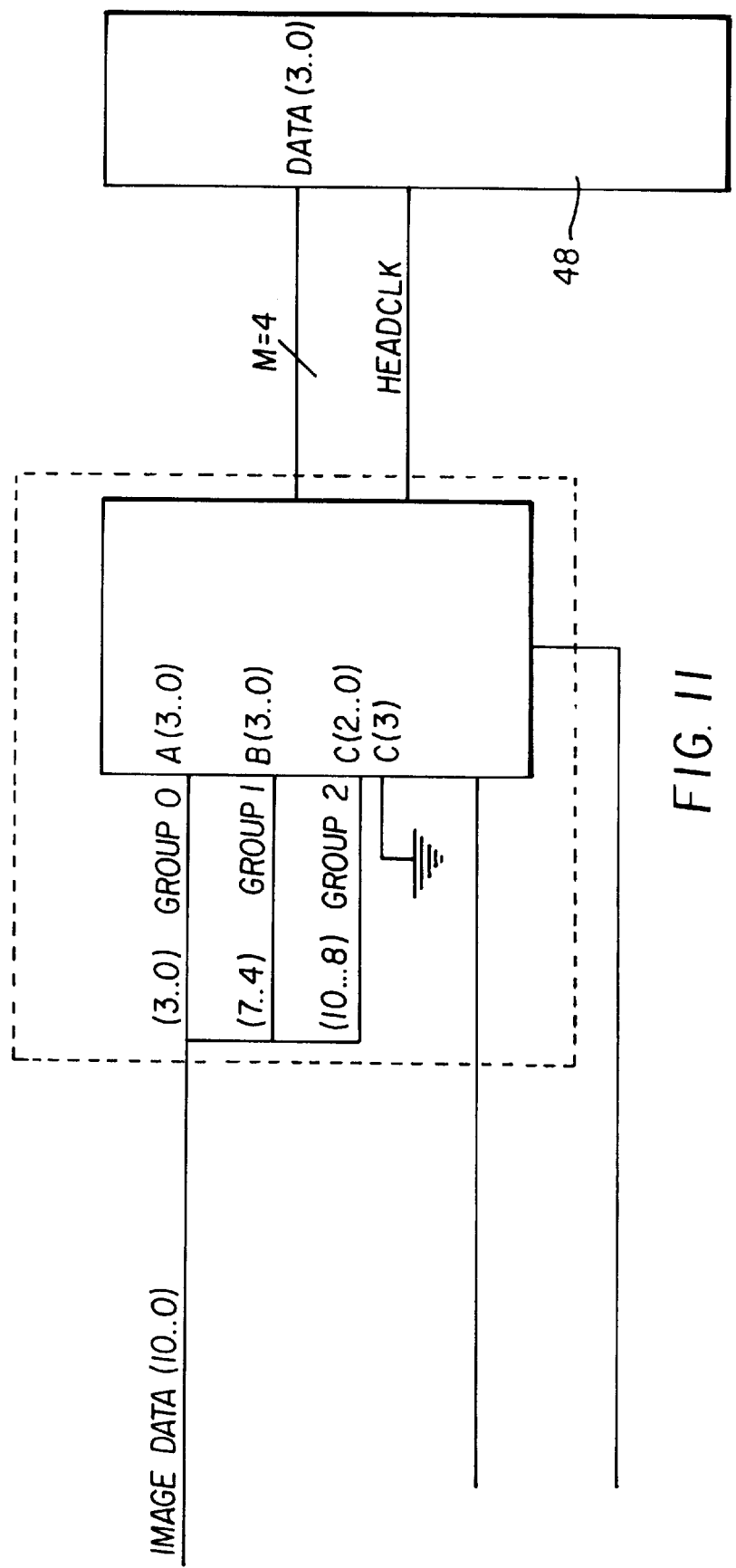
FIG. 11 illustrates splitting of the image data into groups.

To summarize, the technique described consists of first splitting image data, which is N-bits wide into multiple data groups. The maximum allowable width of any group is the width of the input bus of parallel-input print head 48. All groups consist of consecutive bits of the original image data. An example of such a splitting of the image data is illustrated in FIG. 11. This figure shows eleven bit image data having been split into three groups. Group 0 is made up of the four least significant bits of the image data. Group 1 is made up of the next four least significant bits of the image data, and Group 2 is made up of the three most significant bits of the image data. While FIG. 11 illustrates the use of a MUX to accomplish the splitting of the image data, it is appreciated that many options exist for implementing this functionality.

The printing of the $2^N$ levels represented by the image data is achieved by printing the data of each group. For example, Group 0 data would be loaded to print head 48 and printed. Next, Group 1 data would be loaded and printed. Finally, Group 2 data would be loaded and printed. While the order in which the groups are loaded and printed may be selected to meet system requirements, each group must be printed, or modulated, according to its binary weighting in the original image data.

Again referring to FIG. 11, the modulation of Group 1 would be weighted sixteen times more than the weighting of Group-0. The modulation of Group 2 would be weighted sixteen times more than Group 1 or 256 times greater than Group 0. These weighting are approximations to the actual weighting which need to be determined empirically to account for systems effects. The weighting, or more generally the rate at which data is modulated, is controlled by COUNTCLK signal 36. The frequency at which the COUNTCLK is pulsed determines the amount of time a heating element is turned on; or its weighting. Referring to the previous example, Group 0 would have a COUNTCLK frequency approximately sixteen times greater than Group 1, and Group 1 would have a COUNTCLK frequency approximately sixteen times greater than Group 2.

Therefore, printing a single line of image data requires that print head 48 be loaded multiple times with data. Each set of data is made up of a contiguous set of bits of the original image data which is modulated at a rate which is representative of the set's position in the original image data.

From the above description, it is seen that the present invention provides an apparatus and process for receiving image data which is N data bits wide and generating $2^N$ print levels given a print head with an M bit wide parallel data bus, where N≧M. The invention allows the generation of more print levels than are possible from the prescribed use of the print head. Over the printing of a single line of image data, this invention allows the energy to be distributed in various ways.

The invention has been described in detail with particular reference to preferred embodiments thereof, but it will be understood that variations and modifications can be effected within the spirit and scope of the invention.

What is claimed is:

1. A process for printing an image data signal using a parallel input print head which has an input data bus having a width which is narrower than the image data signal, said process comprising:

first, splitting the image data signal into multiple data groups, each data group (1) having a maximum allowable width equal to the width of the input data bus and (2) consisting of consecutive binary value bits of the image data signal;

loading one of the data groups to the print head;

modulating the printhead with a binary weighting representative of the significance of data bits of the one group in the image data;

printing the data of said one of the data groups according to its binary weighting in the image data signal; and repeating the loading and printing steps for other ones of the data groups.

2. A process as set forth in claim 1 wherein the printing step comprises:

deamplifying the value bits of the data groups; and amplifying a printer's output by a factor according to the binary weighting of each data group being printed.

3. A process for receiving original image data which is N data bits wide and generating $2^N$ print levels given a print head with an M-bit wide parallel data input bus, where N≧M, said process comprising:

first, splitting the N-bit wide image data into multiple data groups, each group (1) having a maximum allowable width equal to the width M of the input bus of the print head and (2) consisting of consecutive binary value bits of the original image data;

loading one of the data groups to the print head;

modulating the printhead with a binary weighting representative of the significance of data bits of the one group in the image data;

printing the data of said one of the data groups according to its binary weighting in the image data; and repeating the loading and printing steps for other ones of the data groups.

4. A process as set forth in claim 3 wherein the printing step comprises:

deamplifying the value bits of the data groups; and amplifying a printer's output by a factor according to the binary weighting of each data group being printed.

5. A process as set forth in claim 3 wherein the printing step comprises modulating the data of each group at a rate which is representative of the group's position in the original image data.

6. A printer comprising:

a parallel-input print head having an input bus of predetermined width;

a data controller adapted to split original digital image data into a plurality of data groups consisting of consecutive bits of the original image data such that the maximum width of any group is the width of the input bus of the print head;

a print head controller adapted to sequentially: load one the data bit groups to the print head and modulate the print head with a weighting which is representative of the significance of data bits of the one group in the original image data, and sequentially load each other of the data bit groups to the print head and modulate the print head with a weighting which is representative of the significance of data bits of each other group in the original image data.

7. A printer as set forth in claim 6 wherein the print head controller is adapted to sequentially load one of the data bit groups to the print head and modulate the print head at a first rate which is representative of the significance of the data bits of the one group in the original image data, and sequentially load each other of the data bit groups to the print head and modulate the print head at a second rate which is representative of the significance of data bits of each other group in the original image data.

8. A printer as set forth in claim 6 wherein the data controller comprises a MUX to split the original digital image data into the plurality of groups.

* * * * *